(12) United States Patent
Yu et al.

(10) Patent No.: US 9,774,371 B1
(45) Date of Patent: Sep. 26, 2017

(54) NEAR FIELD COMMUNICATION DEVICE AND SYSTEM

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Zhi-Cheng Yu, Shanghai (CN); Jia-Shan Long, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/235,203

(22) Filed: Aug. 12, 2016

(30) Foreign Application Priority Data

May 27, 2016 (CN) .......................... 2016 1 0360192

(51) Int. Cl.
*H04B 5/00* (2006.01)

(52) U.S. Cl.
CPC ......... *H04B 5/0006* (2013.01); *H04B 5/0031* (2013.01)

(58) Field of Classification Search
CPC ............................ H04B 5/0006; H04B 5/0031
USPC ...................................... 455/41.1, 41.2, 41.3
See application file for complete search history.

(56) References Cited

U.S. PATENT DOCUMENTS

| | | | |
|---|---|---|---|
| 2006/0194622 A1* | 8/2006 | Ganzera | G06K 19/07 455/574 |
| 2011/0130093 A1* | 6/2011 | Walley | G06K 7/10207 455/41.1 |
| 2012/0176085 A1* | 7/2012 | Iida | H02J 7/025 320/108 |
| 2012/0193995 A1* | 8/2012 | Kanno | H02J 5/005 307/104 |
| 2013/0095754 A1* | 4/2013 | Moreton | G06Q 20/3226 455/41.1 |
| 2013/0109304 A1* | 5/2013 | Marcu | G06K 19/0723 455/41.1 |
| 2014/0018017 A1* | 1/2014 | Merlin | G06K 19/07749 455/90.1 |
| 2015/0079903 A1* | 3/2015 | Song | G06K 7/10217 455/41.1 |
| 2015/0097443 A1* | 4/2015 | Moyer | H02J 7/025 307/104 |
| 2015/0105117 A1* | 4/2015 | Larson | H04M 1/6058 455/518 |

(Continued)

*Primary Examiner* — Md Talukder
(74) *Attorney, Agent, or Firm* — Steven Reiss

(57) ABSTRACT

A Near Field Communication (NFC) device includes an NFC processing chip, a voltage conversion chip, a first transformer, and a connector. The NFC processing chip receives and transmits NFC signals. The first transformer is coupled to the NFC processing chip. The connector is coupled to the NFC processing chip and the first transformer, the connector transmits the NFC signals and transmits voltage signals to the first transformer. The first transformer transmits the voltage signal to the voltage conversion chip to supply an operating voltage to the NFC processing chip and the first transformer further transmits alternating current signals to the connector. An NFC system is also provided.

14 Claims, 5 Drawing Sheets

(56) References Cited

U.S. PATENT DOCUMENTS

| | | | |
|---|---|---|---|
| 2015/0215006 A1* | 7/2015 | Mehas | H02J 7/025 307/104 |
| 2015/0244176 A1* | 8/2015 | Van Den Brink | H04B 5/0093 307/104 |
| 2015/0296598 A1* | 10/2015 | Haid | H05B 37/0272 315/291 |

* cited by examiner

NEAR FIELD COMMUNICATION DEVICE AND SYSTEM

FIELD

The subject matter herein generally relates to a near field communication (NFC) device and an NFC system.

BACKGROUND

NFC is a short range wireless connectivity technology that enables the exchange of various types of information. The information exchange may be digital authorizations between two NFC enabled devices such as mobile phones, or between a mobile phone and a compatible chip card or reader that are positioned close to each other. Applications for NFC include use as an access control for content and for services such as cashless payment and ticketing. When a device is to be installed with an NFC module, cost or power supply of the NFC module may become a problem to the device.

BRIEF DESCRIPTION OF THE DRAWINGS

Implementations of the present technology will now be described, by way of example only, with reference to the attached figures.

DETAILED DESCRIPTION

Figure 1:
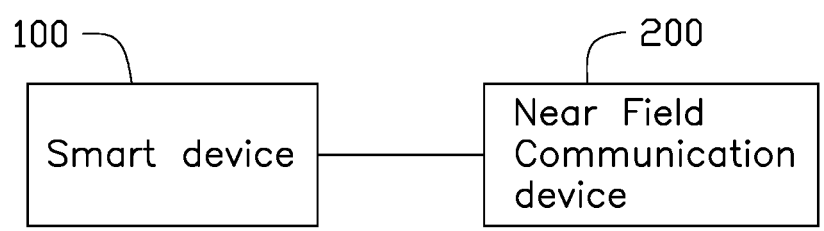
FIG. 1 is a block diagram of an embodiment of an NFC system of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The disclosure will now be described in relation to a near field communication (NFC) system.

FIG. 1 illustrates an embodiment of an NFC system 1000.

The NFC system 1000 can comprise a smart device 100 and an NFC device 200.

The smart device 100 can comprise a 3.5 mm headphone jack that supports open mobile terminal platform (OMTP) standard. The NFC device 200 can comprise a headphone adapter that supports OMTP standard.

The smart device 100 also can comprise a 3.5 mm headphone jack that supports cellular telecommunications and internet association (CTIA) standard. The NFC device 200 can comprise a headphone adapter that supports CTIA standard.

Figure 2:
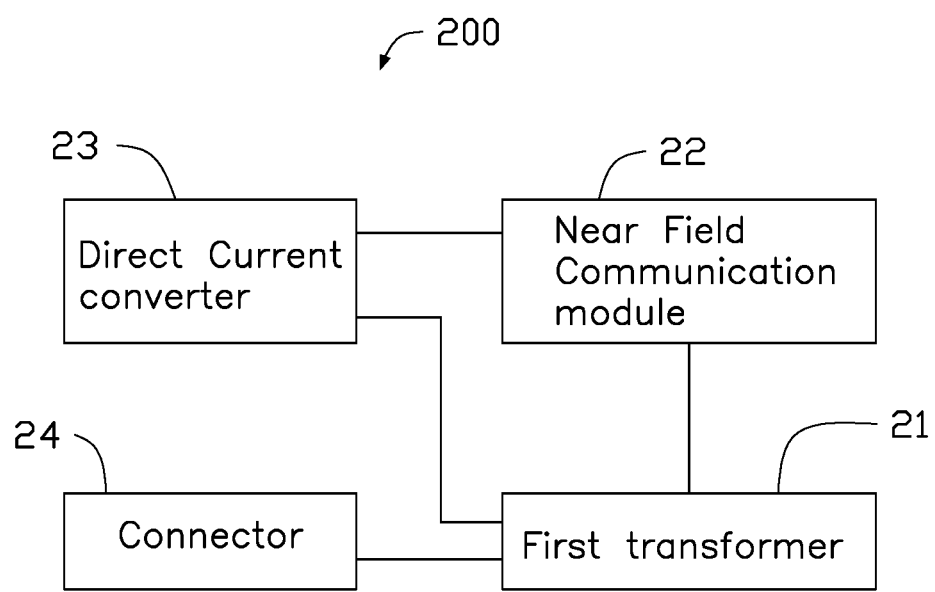
FIG. 2 is a block diagram of an embodiment of an NFC device of the present disclosure.

FIG. 2 illustrates an embodiment of an NFC device 200.

The NFC device 200 can comprise a first transformer 21, an NFC module 22, a direct current (DC) converter 23, and a connector 24. The first transformer 21 is coupled to the smart device 100 via the connector 24. The first transformer 21 is configured to receive voltage signals and NFC signals outputted by the smart device 100.

The first transformer 21 is further coupled to the NFC module 22 and DC converter 23. The first transformer 21 is configured to transmit the voltage signals outputted by the smart device 100 to the DC converter 23. The first transformer 21 is further configured to transmit the NFC signals outputted by the smart device 100 to the NFC module 22.

Figure 3:
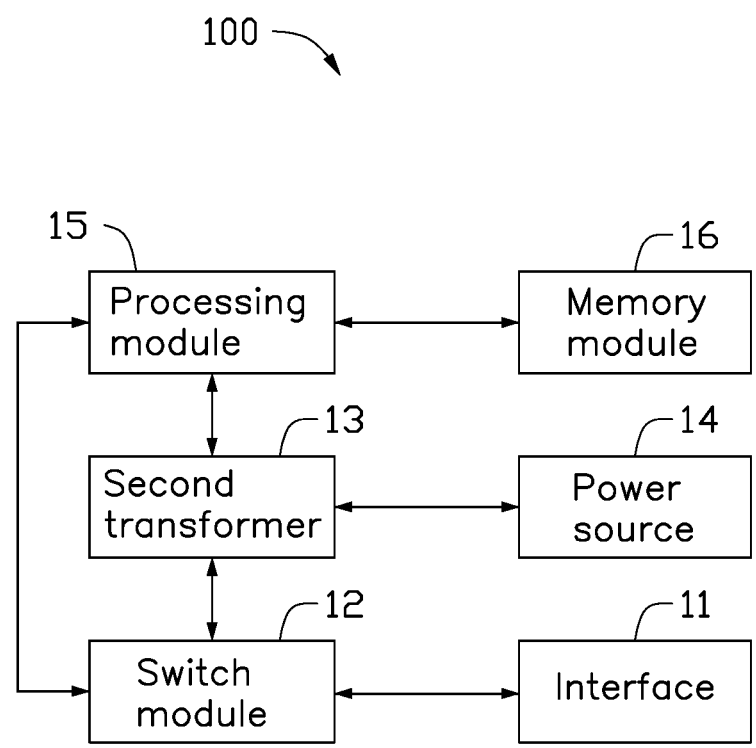
FIG. 3 is a block diagram of an embodiment of a smart device of the present disclosure.

FIG. 3 illustrates an embodiment of a smart device 100.

The smart device 100 can comprise an interface 11, a switch module 12, a second transformer 13, a power source 14, a processing module 15, and a memory module 16. The interface 11 is coupled to the switch module 12. The switch module 12 is coupled to the second transformer 13 and the processing module 15. The second transformer 13 is coupled to the power source 14 and the processing module 15. The processing module 15 is coupled to the memory module 16.

The interface 11 is further coupled to the connector 24, thereby the smart device 100 can communicate with the NFC device 200. The power source 14 is configured to output the voltage signals. The second transformer 13 is configured to transmit the voltage signals outputted by the power source 14 to the NFC device 200. The second transformer 13 is further configured to transmit the NFC signals from the switch module 12 to the processing module 15, or from the processing module 15 to the switch module 12.

The memory module 16 is configured to communicate with the processing module 15 and store data. The switch module 12 is configured to communicate with the processing module 15.

Figure 4:
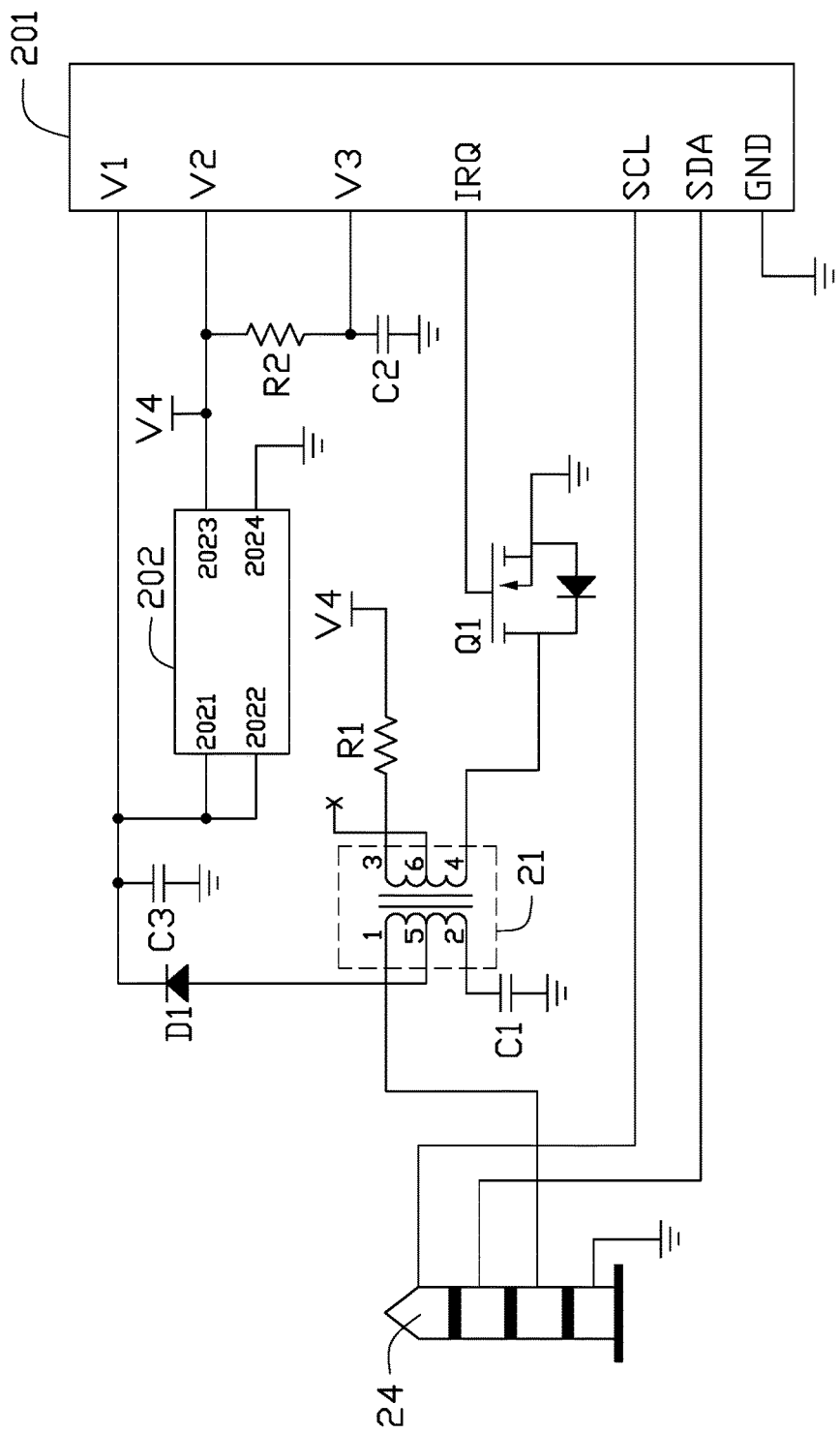
FIG. 4 is a circuit diagram of an embodiment of an NFC device of the present disclosure.

Referring to FIG. 4, the NFC device 200 can further comprise an NFC processing chip 201, a voltage conversion chip 202, a first capacitor C1, a second capacitor C2, a third capacitor C3, a first diode D1, a first electronic switch Q1, a first resistor R1, and a second resistor R2.

A connector first terminal 241 is coupled to an NFC processing chip clock pin SCL. A connector second terminal 242 is coupled to an NFC processing chip data pin SDA. A connector third terminal 243 is coupled to a first transformer first terminal 1 and a connector fourth terminal 244 is grounded.

A first transformer second terminal 2 is grounded via the first capacitor C1. A first transformer third terminal 3 is coupled to a fourth voltage terminal V4 via the first resistor R1 and a first transformer fourth terminal 4 is coupled to a first electronic switch first terminal. A first transformer fifth terminal 5 is coupled to a first diode anode and a first transformer sixth terminal 6 is unconnected. A first diode cathode is coupled to an NFC processing chip first voltage pin V1, a voltage conversion chip input pin 2021, and a voltage conversion chip enable pin 2022. The first diode cathode is further grounded via the third capacitor C3.

A voltage conversion chip output pin 2023 is coupled to an NFC processing chip second voltage pin V2 and a voltage conversion chip ground pin 2024 is grounded. The voltage conversion chip output pin 2023 is further grounded via the second resistor R2 and the second capacitor C2. The NFC processing chip second voltage pin V2 is coupled to the fourth voltage terminal V4 and an NFC processing chip third voltage pin V3 is coupled to a node between the second resistor R2 and the second capacitor C2. An NFC processing chip signal pin IRQ is coupled to a first electronic switch second terminal. An NFC processing chip ground pin GND and a first electronic switch third terminal are grounded.

In one embodiment, the first electronic switch Q1 comprises an N type field effect transistor. The first electronic switch first terminal is a N type field effect transistor drain electrode. The first electronic switch second terminal is a N type field effect transistor gate electrode and the first electronic switch third terminal is a N type field effect transistor source electrode.

The NFC processing chip 201 outputs a first pulse signal via the signal pin IRQ, and the first electronic switch second terminal receives the first pulse signal to control the first electronic switch Q1 to turn on or turn off. Thereby, a primary side of the first transformer 21 generates a first alternating current (AC) signal and a secondary side of the first transformer 21 generates a second AC signal. The first transformer 21 outputs the second AC signal via the connector 24.

In one embodiment, the first pulse signal can be an interrupt signal.

The connector 24 receives a smart device first operating voltage and transmits the smart device first operating voltage to the first transformer first terminal 1. The first transformer fifth terminal 5 outputs a second operating voltage and the voltage conversion chip 202 receives and converts the second operating voltage to output a third operating voltage. The NFC processing chip second voltage pin V2 receives the third operating voltage as an NFC processing chip operating voltage. The first transformer 21 can reduce signal interference between operating voltages and the NFC signals.

In one embodiment, the connector 24 can comprise an earphone plug. The NFC signals comprises clock signals and data signals.

Figure 5:
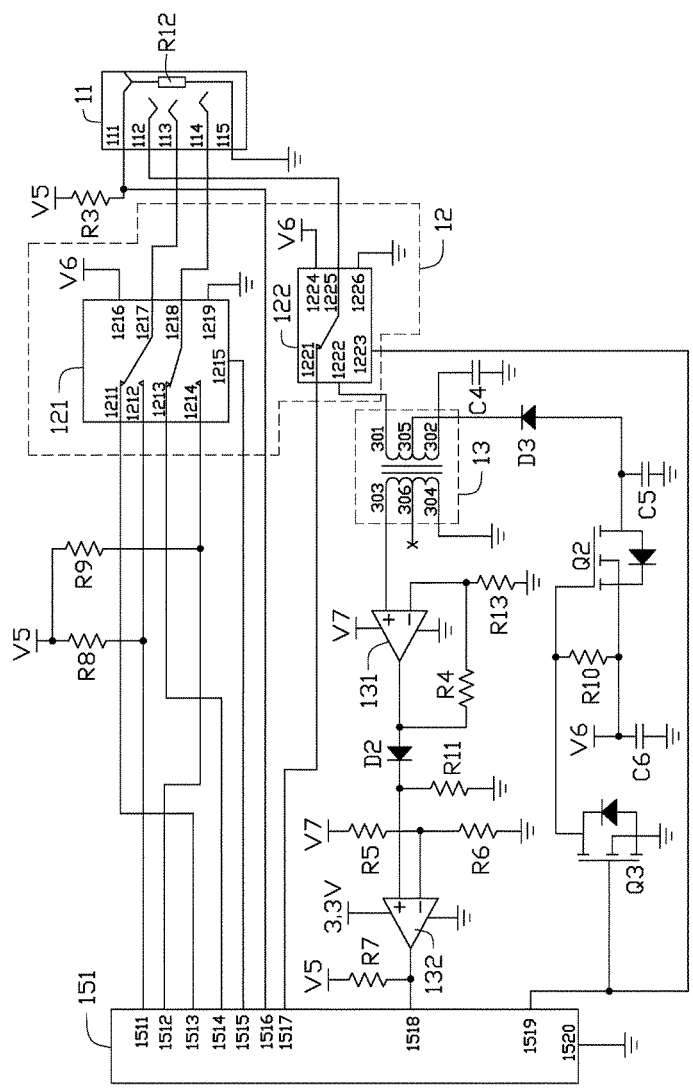
FIG. 5 is a circuit diagram of an embodiment of a smart device of the present disclosure.

Referring to FIG. 5, the smart device 100 can further comprise a first switch chip 121, a second switch chip 122, an operational amplifier 131, a comparator 132, a second electronic switch Q2, and a third electronic switch Q3. The smart device 100 also comprises a second diode D2 and a third diode D3. The smart device 100 also comprises third to thirteenth resistors, R3 to R13, together with fourth to sixth capacitors, C4 to C6, and a processing chip 151.

The switch module comprises the first switch chip 121 and the second switch chip 122. A interface first pin 111 is coupled to a fifth voltage terminal V5 via the third resistor R3 and the interface first pin 111 is further coupled to a processing chip detecting pin 1516. When the interface 11 connects to the connector 24, the interface first pin 111 can be grounded via the twelfth resistor R12 and a interface fifth pin 115. A interface second pin 112 is coupled to a second switch chip input pin 1225. A interface third pin 113 is coupled to a first switch chip seventh pin 1217 and a interface fourth pin 114 is coupled to a first switch chip eighth pin 1218.

A first switch chip first pin 1211 is coupled to a processing chip third pin 1513 and a first switch chip second pin 1212 is coupled to a processing chip first pin 1511. A first switch chip third pin 1213 is coupled to a processing chip fourth pin 1514 and a first switch chip fourth pin 1214 is coupled to a processing chip second pin 1512. A first switch chip fifth pin 1215 is coupled to a processing chip fifth pin 1515. A first switch chip sixth pin 1216 is coupled to a sixth voltage terminal V6 and a first switch chip ninth pin 1219 is grounded. The first switch chip second pin 1212 is further coupled to the fifth voltage terminal V5 via the eighth resistor R8 and the first switch chip fourth pin 1214 is further coupled to the fifth voltage terminal V5 via the ninth resistor R9.

A second switch chip first pin 1221 is coupled to a processing chip seventh pin 1517 and the second switch chip second pin 1222 is coupled to a second transformer first terminal 301. A second switch chip third pin 1223 is coupled to a processing chip ninth pin 1519, a second switch chip fourth pin 1224 is coupled to the sixth voltage terminal V6, and a second switch chip sixth pin 1226 is grounded. A second transformer second terminal 302 is grounded via the fourth capacitor C4 and a second transformer third terminal 303 is coupled to an operational amplifier positive input terminal. A second transformer fourth terminal 304 is grounded, a second transformer fifth terminal 305 is coupled to a third diode cathode, and a second transformer sixth terminal 306 remains unconnected. A third diode anode is grounded via the fifth capacitor C5. The third diode anode is further coupled to a second electronic switch first terminal. A second electronic switch second terminal is coupled to a third electronic switch first terminal. The second electronic switch second terminal is further coupled to the sixth voltage terminal V6 via the tenth resistor R10. A second electronic switch third terminal is coupled to the sixth voltage terminal V6 and the sixth voltage terminal V6 is grounded via the sixth capacitor C6.

A third electronic switch second terminal is coupled to the processing chip ninth pin 1519 and a third electronic switch third terminal is grounded. An operational amplifier negative input terminal is grounded via the thirteenth resistor R13. The fourth resistor R4 is coupled between the operational amplifier negative input terminal and an operational amplifier output terminal. An operational amplifier power terminal is coupled to a seventh voltage terminal V7 and an operational amplifier ground terminal is grounded. The operational amplifier output terminal is coupled to a second diode anode. A second diode cathode is grounded via the eleventh resistor R11 and the second diode cathode is further coupled to a comparator positive input terminal. A comparator negative input terminal is coupled to the seventh voltage terminal V7 via the fifth resistor R5 and the comparator negative input terminal is further grounded via the sixth resistor R6. A comparator output terminal is coupled to a processing chip eighth pin 1518 and the comparator output terminal is further coupled to the fifth voltage terminal V5 via the seventh resistor R7.

The fifth voltage terminal V5 is grounded via the third resistor R3 and the twelfth resistor R12 in response to the connector 24 of the NFC device 200 being coupled to the smart device interface 11. When a voltage of the processing chip detecting pin 1516 increases by being high level signal, the smart device 100 determines that the interface 11 is coupled the NFC device connector 24. The processing chip fifth pin 1515 and the processing chip ninth pin 1519 output high level signal and the first switch chip fifth pin 1215 and the second switch chip third pin 1223 receive the high level signal.

When the first switch chip fifth pin 1215 receives the high level signal, the first switch chip seventh pin 1217 is coupled to the first switch chip second pin 1212. The first switch chip eighth pin 1218 is coupled to the first switch chip fourth pin 1214. When the second switch chip third pin 1223 receives the high level signal, the second switch chip fifth pin 1225 is coupled to the second switch chip second pin 1222.

When the first switch chip fifth pin 1215 and the second switch chip third pin 1223 receive the high level signal, the processing chip first pin 1511 is coupled to the NFC processing chip clock pin SCL. The processing chip second pin 1512 is coupled to the NFC processing chip data pin SDA. The second transformer first terminal 301 receives the second AC signal and couples the second AC signal to the operational amplifier positive input terminal. The operational amplifier 131 amplifies the second AC signal and the second diode D2 rectifies the second AC signal to generate the third AC signal. The comparator 132 receives the third AC signal to generate a second pulse signal and the comparator 132 transmits the second pulse signal to the processing chip eighth pin 1518.

When the processing chip ninth pin 1519 outputs the high level signal, the third electronic switch second terminal is at high level and the third electronic switch Q3 is turned on. Thereby, the second electronic switch second terminal is at low level and the second electronic switch Q2 is turned on. The second transformer fifth terminal 305 can be coupled to the sixth voltage terminal V6 to obtain a voltage signal. The NFC device 200 also can obtain the sixth voltage terminal voltage signal via the second switch chip 122 and the interface 11.

In one embodiment, the second electronic switch Q2 is a P type field effect transistor. The third electronic switch Q3 is a N type field effect transistor. The second electronic switch first terminal is the P type field effect transistor drain electrodes. The second electronic switch second terminal is the P type field effect transistor gate electrodes. The second electronic switch third terminal is the P type field effect transistor source electrodes. The third electronic switch first terminal is the N type field effect transistor drain electrodes. The third electronic switch second terminal is the N type field effect transistor gate electrodes. The third electronic switch third terminal is the N type field effect transistor source electrodes.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A near field communication (NFC) device, comprising:
   an NFC processing chip, configured to receive and transmit NFC signals, the NFC processing chip comprising an NFC processing chip clock pin and an NFC processing data pin;
   a voltage conversion chip, configured to convert voltage signals;
   a first transformer, coupled to the NFC processing chip, the first transformer comprising a first transformer first terminal, a first transformer fifth terminal, the first transformer fifth terminal coupled to a first diode; and
   a connector, the connector comprising a connector first terminal, a connector second terminal and a connector third terminal, the connector first terminal coupled to the NFC processing chip clock pin, and the connector second terminal coupled to the NFC processing chip data pin, and the connector third terminal coupled to the first transformer first terminal; the connector configured to transmit the NFC signals, the connector further configured to receive the voltage signals and transmit the voltage signals to the first transformer;
   wherein the first transformer is configured to transmit the voltage signals to the voltage conversion chip to supply an operating voltage to the NFC processing chip through the first diode, the first transformer is further configured to transmit alternating current (AC) signals to the connector.

2. The NFC device of claim 1, further comprising a first capacitor, a second capacitor, a third capacitor, a first electronic switch, a first resistor, and a second resistor; wherein a first transformer third terminal receives the operating voltage of the NFC device via the first resistor, a first transformer fourth terminal is coupled to a first electronic switch first terminal, an NFC processing chip signal pin is coupled to a first electronic switch second terminal, and a first electronic switch third terminal is grounded.

3. The NFC device of claim 2, wherein a connector fourth terminal is grounded, and a first transformer fifth terminal is coupled to a first diode anode.

4. The NFC device of claim 2, wherein a first diode cathode is coupled to an NFC processing chip voltage pin, a voltage conversion chip input pin, and a voltage conversion chip enable pin.

5. The NFC device of claim 1, wherein the connector comprises an earphone plug.

6. An near field communication (NFC) system, comprising:
   an NFC device, comprising:
      an NFC processing chip, configured to receive and transmit NFC signals, the NFC processing chip comprising an NFC processing chip clock pin and an NFC processing data pin;
      a voltage conversion chip, configured to convert voltage signals;
      a first transformer, coupled to the NFC processing chip, the first transformer comprising a first transformer first terminal, a first transformer fifth terminal, the first transformer fifth terminal coupled to a first diode; and
      a connector, the connector comprising a connector first terminal, a connector second terminal and a connector third terminal, the connector first terminal coupled to the NFC processing chip clock pin, and the connector second terminal coupled to the NFC processing chip data pin, and the connector third terminal coupled to the first transformer first terminal; the connector configured to transmit the NFC signals, the connector further configured to receive the voltage signals and transmit the voltage signals to the first transformer;
      wherein the first transformer is configured to transmit the voltage signals to the voltage conversion chip to supply an operating voltage to the NFC processing chip through the first diode, the first transformer is further configured to transmit alternating current (AC) signals to the connector; and a smart device, comprising:
an interface, coupled to the connector of the NFC device, configured to receive the AC signals;
a switch module;
a second transformer;
a power source, configured to output the voltage signals; and
a processing module, configured to receive the NFC signals outputted by the NFC processing chip.

7. The NFC system of claim 6, wherein the NFC device further comprises a first capacitor, a second capacitor, a third capacitor, a first electronic switch, a first resistor, and a second resistor; a first transformer third terminal receives the operating voltage of the NFC device via the first resistor, a first transformer fourth terminal is coupled to a first electronic switch first terminal, an NFC processing chip signal pin is coupled to a first electronic switch second terminal, and a first electronic switch third terminal is grounded.

8. The NFC system of claim 7, wherein a connector fourth terminal is grounded, and a first transformer fifth terminal is coupled to a first diode anode.

9. The NFC system of claim 7, wherein a first diode cathode is coupled to an NFC processing chip voltage pin, a voltage conversion chip input pin, and a voltage conversion chip enable pin.

10. The NFC system of claim 7, wherein the first electronic switch comprises an N type field effect transistor.

11. The NFC system of claim 6, wherein the connector comprises an earphone plug.

12. The NFC system of claim 6, wherein the switch module comprises a first switch chip and a second switch chip, the first switch chip is configured to transmit clock signals and data signals outputted by the NFC processing chip to the processing module, the second switch chip is configured to transmit interrupt signals outputted by the NFC processing chip to the processing module.

13. The NFC system of claim 12, wherein the first transformer receives and converts the interrupt signals to the AC signals.

14. The NFC system of claim 12, wherein the first transformer, the second switch chip and the second transformer are configured to transmit interrupt signals outputted by the NFC processing chip to the processing module.

* * * * *